Aug. 21, 1923.

F. OLDHAM

INSECT EXTERMINATOR

Filed July 13, 1922

Inventor
Frank Oldham
By Jack Athley
Attorney

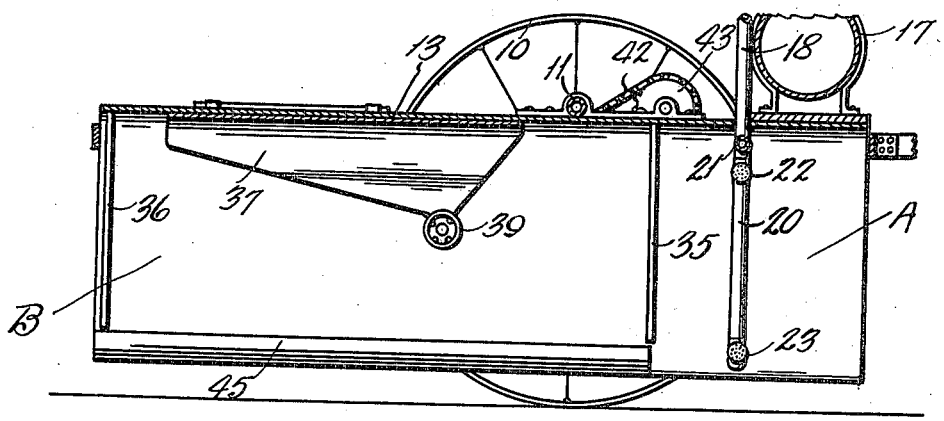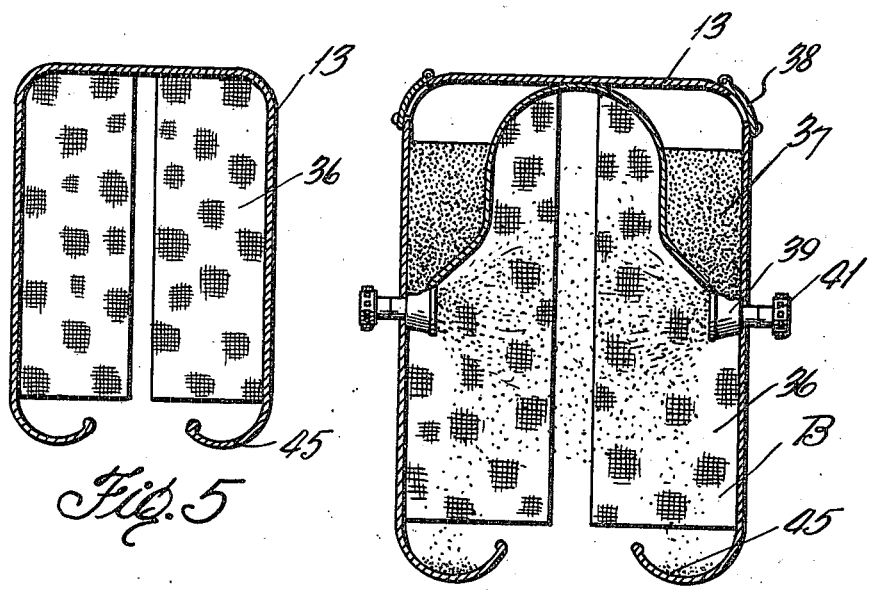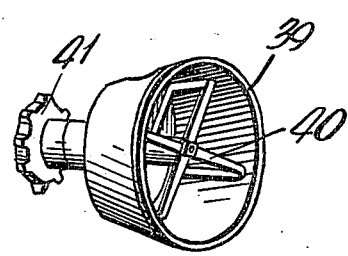

Patented Aug. 21, 1923.

1,465,557

UNITED STATES PATENT OFFICE.

FRANK OLDHAM, OF DALLAS, TEXAS.

INSECT EXTERMINATOR.

Application filed July 13, 1922. Serial No. 574,635.

*To all whom it may concern:*

Be it known that I, FRANK OLDHAM, a citizen of the United States, residing at Dallas, in the county of Dallas and State of Texas, have invented certain new and useful Improvements in Insect Exterminators, of which the following is a specification.

This invention relates to new and useful improvements in insect exterminators.

The object of the invention is to provide a machine adapted to straddle a row of plants and carrying means for spraying said plants in advance of means for dusting the same with a suitable powder poisonous to boll weevils and other insects.

I am aware that machines of this character are already known in the art, but the same are objectionable because the poisonous dust is applied only to the outer branches of the plants, leaving the inner portions untreated. Furthermore, no means is provided for confining either the moisture or the dust to the row under treatment, whereby a large portion of the plants are unaffected and the powder is permitted to scatter over the field without adhering to the plants.

One of the primary objects of the invention is to provide means for concentrating the application of the liquid and powder to the plants in a particular row, whereby all parts of said plants are thoroughly treated and the waste is reduced to a minimum In carrying out the invention I provide an elongated hood carried by a wheeled support and adapted to straddle a row of plants. Said hood is divided into two separate compartments, the forward constituting a misting or spraying chamber and the rear compartment a dusting chamber. A plurality of sprays are disposed in the misting chamber in position to apply moisture to parts of the plants. A cloud of poisonous dust is circulated in the rear chamber, and as the wet plants pass therethru said dust adheres to the leaves and branches, whereby a thorough application is effected and the loss of powder is reduced to a minimum.

A construction designed to carry out the invention will be hereinafter described together with other features of the invention.

The invention will be more readily understood from a reading of the following specification and by reference to the accompanying drawings, in which an example of the invention is shown and wherein:

Fig. 4 is a longitudinal vertical sectional view of the hood, Fig. 5 is a cross section of the same taken on the line 5—5 of Fig. 1.

Fig. 6 is a similar view on an enlarged scale taken on the line 6—6 of Fig 1, and Fig. 7 is a detail of one of the powder dischargers.

Figure 1:
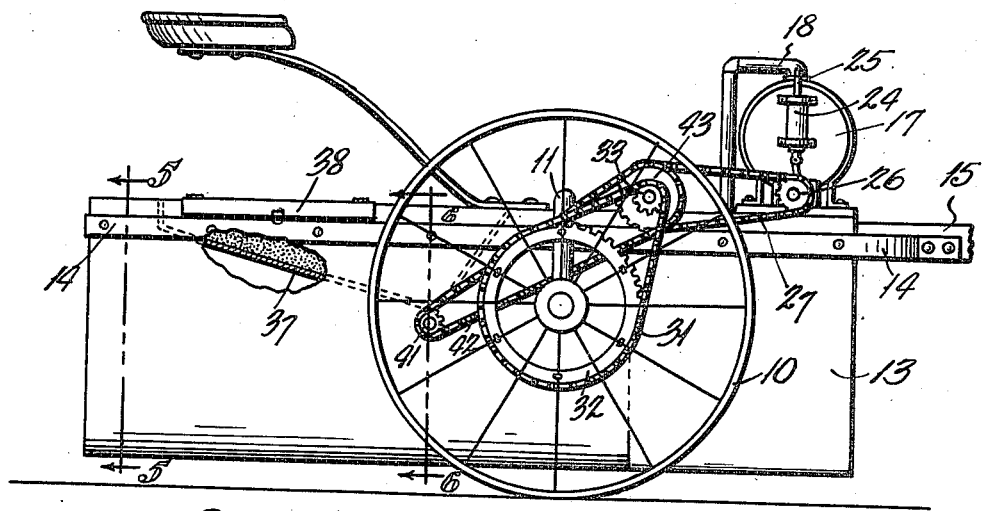
Fig. 1 is a side elevation of a machine constructed in accordance with my invention.
Figure 2:
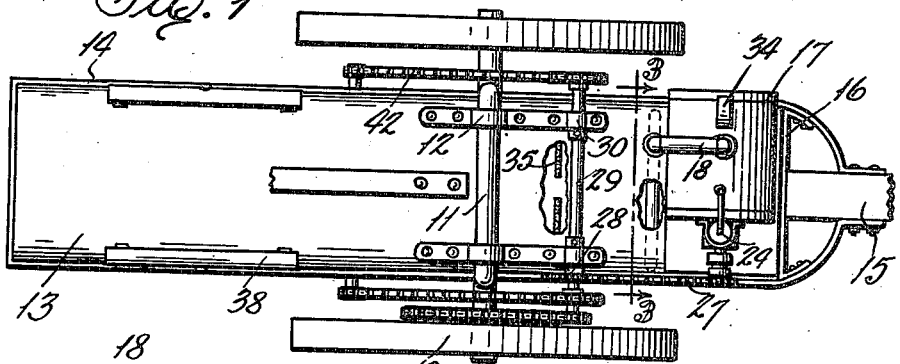
Fig. 2 is a plan view of the same.

In the drawings the numeral 10 designates a pair of ground wheels carrying an arch axle 11. Located below the axle and secured thereto by any suitable means such as by hangers 12, is an elongated hood or body 13. The said hood is substantially inverted U-shaped, and a rectangular frame member 14 is engaged over the top portion thereof and riveted or otherwise secured thereto. The forward ends of said member are bowed inwardly and secured to a tongue 15, said ends being braced by a transverse bar 16, to which the tongue may be also secured, if desired.

It is pointed out that the machine is adapted to straddle a row, and the plants pass thru the said body or hood as the machine is drawn. The forward portion of the hood constitutes a misting chamber A where water or other suitable liquid is applied to the plants, and the latter part a dusting chamber B where said plants are treated with a poisonous dust as they pass therethru.

Figure 3:
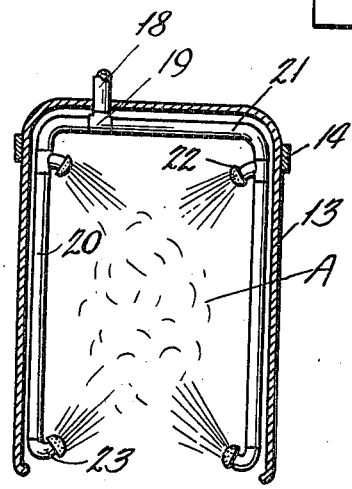
Fig. 3 is a cross sectional view of the hood taken on the line 3—3 of Fig. 2.

A tank 17 for containing a liquid is mounted on the forward end of said hood and a supply pipe 18 extends out of the top of said tank and is directed downwardly at right angles so that the lower end depends slightly within the chamber A. Said lower end is connected in a T 19 and two branches, 20 and 21, extend in opposite directions and are then directed downwardly along the respective sides of said hood. Upper nozzles 22 are connected in said branches and are inclined downwardly towards the center of the hood, while similar nozzles 23 are located at the lower ends and are given an upward inclination, as is shown in Fig. 3. It will be seen that by the disposition of said nozzles, the liquid is directed onto the plants from all sides, and by confining the moisture within the chamber a mist is created that reaches all parts of said plants.

For keeping the liquid in said tank under pressure I provide a suitable air pump 24 communicating with said tank by means of a pipe 25 and which is driven by means of a crank shaft on which is mounted a sprocket wheel 26. The said sprocket wheel is driven by means of a chain 27 off a larger sprocket wheel 28 which is mounted on a transverse shaft 29. The said shaft is journaled in suitable bearings 30 and is driven off one of the ground wheels 10 by means of a chain 31 and sprocket wheels 32 and 33, in an obvious manner. A gage 34 may be mounted in the tank 17 for registering the pressure therein.

The chamber A is separated from the chamber B by means of a pair of fabric curtains 35 similar to a pair 36 located at the rear of the last named chamber, and which are shown better in Figs. 5 and 6. The curtains 35 prevent the mist and dust from mixing, and the curtains 36 help to confine said dust within the rear chamber. An elongated hopper 37 is formed in the upper portion of the chamber B on each side thereof, and closures 38 are provided for filling opening located in the upper sides of the hood or body 13. A powder discharger is located on each side of the chamber at the lower most point of the hopper and the powder is delivered into a flaring mouthpiece 39 directed inwardly. A reel 40 is adapted to revolve within said mouthpiece and is mounted on a shaft extending thru a suitable bearing in the side of the body 13. The outer end of said shaft is provided with a sprocket wheel 41 which is driven by a chain 42 running from a larger sprocket wheel 43 on the end of the shaft 29, there being a wheel 43 on each end of said shaft. It will be seen that as the said reels revolve the powder is discharged from the mouthpieces 39 in the form of a dust, as is shown in Fig. 6. By confining said dust within the chamber B a dense cloud of the poisonous matter is soon created, and as the wet plants pass thru said cloud, the dust reaches all parts of the same and adheres to the leaves and branches. The lower ends of the body 13 may be bent inwardly, if desired, to provide troughs 45 for catching any powder that would fall below the plants.

It is evident that by confining the moisture and dust within an enclosure and thereby concentrating the application on the particular row under treatment, much better results are obtained at less expense.

Various changes in the size and shape of the different parts, as well as modifications, may be made without departing from the spirit of the invention, and the invention contemplates all such changes and modifications as come within the scope of the appended claims.

What I claim, is:

1. In a combined liquid spraying and powder dusting machine, a portable support, an elongated hood carried by the support and adapted to straddle a row and encase the plants received therein, a transverse partition in the hood for dividing the hood into a misting chamber and a dusting chamber, means in the misting chamber of the hood for spraying the plants with a liquid, and means in the dusting chamber for dusting the plants with a powder.

2. In a combined liquid spraying and powder dusting machine, a portable support, an elongated hood carried by the support and adapted to straddle a row and encase the plants received therein, liquid spray nozzles located on each side in the forward portion of the hood, and powder dusting nozzles on each of the hood intermediate the spray nozzles and the rear end of the hood, whereby the plants are first sprayed with a liquid and dusted with a powder while within the hood and the spray and powder being confined about the plants by the hood.

3. In a combined liquid spraying and powder dusting machine, a portable support, an elongated hood carried by the support and adapted to straddle a row and encase the plants received therein, a flexible transverse partition having a central vertical opening to permit the plants to pass therethru, said partition dividing the hood into a misting chamber and the dusting chamber, means in the misting chamber of the hood for spraying the plants with a liquid, and means in the dusting chamber for dusting the plants with a powder.

4. In a liquid spraying and powder dusting machine, a portable support, an elongated hood carried by the support and adapted to straddle a row and encase the plants received therein, liquid spraying means on each side of the forward portion of the hood, powder dusting means on each side of the hood rearwardly of the spraying means, a transverse partition in the hood between the spraying and dusting means, and inwardly directed collecting pans along the lower edges of the hood.

5. In a liquid spraying and powder dusting machine, a portable support, an elongated hood carried by the support and adapted to encase the plants received therein, liquid spray nozzles on each side within the forward portion of the hood, means for supplying a liquid to the nozzles under pressure, powder hoppers carried on each side of the hood, and dusting elements within the hood supplied by said hoppers, means for operating the dusting elements, and a pair of spaced transverse fabric curtains in the hood located between the nozzles and the dusting elements.

In testimony whereof I affix my signature.

FRANK OLDHAM.